BEST AVAILABLE COPY
A. DRAKE.
Corn-Planter.
No. 205 A. I. Patented Sept. 28, 1858.
BEST AVAILABLE COPY
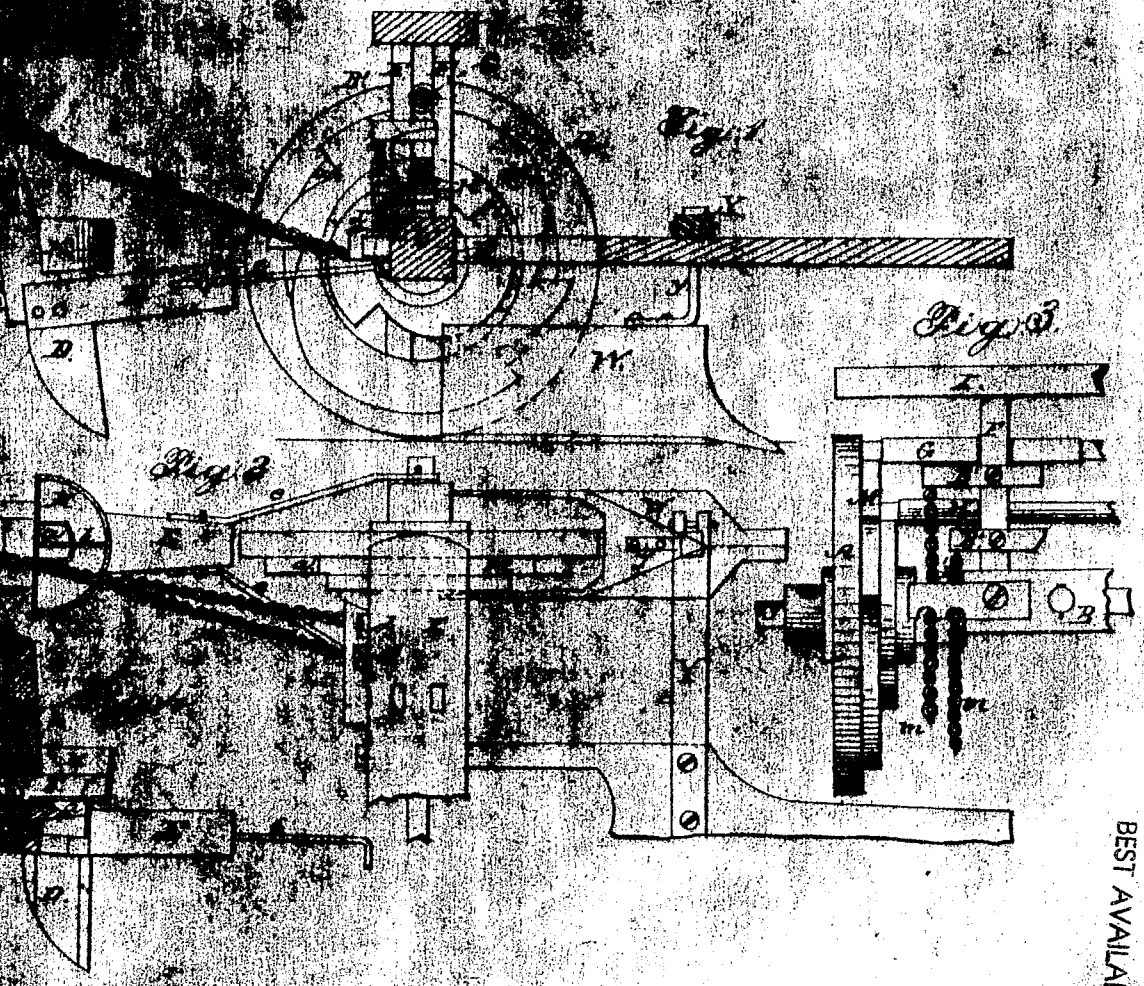

BEST AVAILABLE COPY

UNITED STATES PATENT OFFICE.

NATHANIEL DRAKE, OF NEWTON, NEW JERSEY.

IMPROVEMENT IN CORN-PLANTERS.

Specification forming part of Letters Patent No. 19,242, dated February 2, 1858; Additional Improvement No. 205, dated September 28, 1858.

*To all whom it may concern:*

Be it known that I, NATHANIEL DRAKE, of Newton, in the county of Sussex and State of New Jersey, have invented certain new and useful Improvements in Corn-Planters, the construction and operation of which I have described in the following specification and illustrated in the accompanying drawings with sufficient clearness to enable competent and skillful workmen in the arts to which it pertains or is most nearly allied to make and use my invention.

My said invention consists, first, in the construction and attachment to the upper valve of an agitator, as described, by which the motion of the seed and the consequent filling of the seed-measuring cavity are more effectually secured; second, in the combination and arrangement of parts, hereinafter described, by which the vertical vibration of the seed-boxes and their attachments is prevented from materially affecting the position or operation of the seed-valves.

In the accompanying drawings, Figure 1 is a sectional elevation of my improved machine. Fig. 2 is a plan of a portion of it. Fig. 3 is a rear elevation of the same portion. Fig. 4 is a sectional elevation of one of the seed-boxes and its valves so far as the same and similar parts exist in the machine hereinafter described. The same letters of reference are used to denote them in the drawings which accompany this specification and form a part of it as those employed to designate corresponding parts in the patent granted to me the 2d day of February, 1858, to which patent I refer for my description of the parts therein contained and their mode of operation.

It is considered an object with farmers to plant in what is termed "check-rows," or, in other words, in rows both ways; but this has been found very difficult (even when the best machines for that purpose have been used) on account of the difference caused in the rotation of the traction-wheels by the unevenness of the ground. To obviate this difficulty I now attach a plow, W, forward of each of the traction-wheels to level the ground and cause said wheel to measure the distance across the field with greater uniformity and less liability to get out of check. These plows are attached to the tongue of the machine by means of the braces Z and the beam Y, which last is firmly attached to the tongue. The position of the forward end or working portion of these plows between the wheels and the beam, from both which they derive a portion of their support, as a consequence are less liable to sudden vertical deviations than either, by which arrangement a very even tread is secured for the wheels, and, as their path has less vertical deviations, their measurement is less erratic.

In order to secure greater certainty in the filling of the seed-measuring cavity, I have formed the cam M with an additional depression at $a'$, by which the upper valve is returned and again withdrawn, thus giving it two outward and returned motions as often as the lower valve is once opened and closed.

To further agitate the seed and secure still greater certainty in filling the seed-measuring cavity, I attach a rib, $b'$, to the upper valve, $a$, which rib insures a very perfect agitation of the seed in the hopper. The form and construction of this rib are fully shown in the Figs. 2 and 4.

In my former arrangement of the chains which operate the seed-valves I have found that a very considerable elevation or depression of one of the plows might derange the position and operation of the valves. To remedy this defect I now attach the chains which operate the valves to levers B′ and extend them under the pulleys $d'$, and thence back to the valve-levers, by which arrangement the effect of the vibration of the plows in taking up or slackening the chains which work the valves is mostly neutralized. The levers B′ are bent to extend under the rollers for weights G and H, as shown in Fig. 1. These levers should, perhaps, in most cases be made of iron, though they are here represented as being made of wood.

The particular improvements which constitute my said invention, and which I claim as having been originally and first invented by me, are—

1. The rib $b'$, attached to the upper valve, constructed and operating as shown and described, for the purpose stated.

2. Extending the chains which operate the valves down under the pulleys $d'$ back of the axle, so as to obviate the slackening and taking up of the chains by the vibrations of the plows D and their attachments, as set forth.

N. DRAKE.

W[illegible]esses:

[illegible]M. DRAKE,

[illegible] CONGER.